United States Patent [19]

Eguchi et al.

[11] Patent Number: 4,610,127
[45] Date of Patent: Sep. 9, 1986

[54] COMBINE HARVESTER

[75] Inventors: Jyutaro Eguchi; Junzo Sukenari; Shinzo Kashino; Ryuichi Minami; Tetsuichi Odahara; Masahiro Iwashita, all of Sakai, Japan

[73] Assignee: Kubota, Ltd., Osaka, Japan

[21] Appl. No.: 767,675

[22] Filed: Aug. 22, 1985

Related U.S. Application Data

[63] Continuation of Ser. No. 618,711, Jun. 8, 1984, abandoned.

[30] Foreign Application Priority Data

Jun. 15, 1983 [JP] Japan .................................. 58-91773

[51] Int. Cl.4 ............................................. A01F 12/10
[52] U.S. Cl. .................................. 56/14.6; 130/27 R; 130/27 AB
[58] Field of Search ......... 56/14.6; 130/27 R, 27 AB, 130/27 AE, 27 AF, 27 B, 27 H, DIG. 2

[56] References Cited

U.S. PATENT DOCUMENTS

| 2,262,453 | 11/1941 | Dray ............................ 130/27 R |
| 2,841,945 | 7/1958 | Brenner ......................... 130/27 R |
| 3,537,243 | 11/1970 | Bichel ........................... 56/14.6 |
| 4,474,188 | 10/1984 | Kashino ......................... 56/14.6 |

FOREIGN PATENT DOCUMENTS

| 792503 | 3/1958 | United Kingdom ................. 56/14.6 |
| 2057240 | 5/1981 | United Kingdom ............. 130/27 R |
| 2102664 | 2/1983 | United Kingdom ............. 130/27 R |

Primary Examiner—Robert P. Swiatek
Assistant Examiner—John G. Weiss
Attorney, Agent, or Firm—Edwin E. Greigg

[57] ABSTRACT

A combine harvester comprising a threshing chamber having a threshing drum, a reaping section, a separating section, a conveyor and guide means of V-shaped disposed in the threshing chamber wherein the center line of the reaping section in the longitudinal direction of the harvester body and the tip of the guide means are deviated to the same side with respect to the center line of the conveyor in the longitudinal direction of the harvester body.

2 Claims, 3 Drawing Figures

COMBINE HARVESTER

This is a continuation of copending application Ser. No. 618,711 filed June 8, 1984, and now abandoned.

BACKGROUND OF THE INVENTION

The present invention relates to a combine harvester which includes a reaping section with a conveyor having a width smaller than that of the reaping section and a threshing chamber with the conveyor disposed forwardly of the threshing chamber. The threshing chamber having a threshing drum rotatable about a transverse axis with respect to the harvester body, so that the harvested or cut stalks are fed substantially to the center entrance of the conveyor.

The combine harvester of this type has already been known as is disclosed in British Patent Publication No. GB 2057240A.

However, in such a combine harvester in which an operation block comprising an operation section, an engine and so forth, is disposed or arranged on the side of the harvester body which includes the above mentioned threshing chamber and a separating section disposed rearwardly thereof, the operation block is so constructed sometimes as to project outwardly from the width of the above mentioned reaping section.

Such arrangement, therefore, causes difficulty in realizing compactness of the harvester body and further the projecting block likely damages the stalks standing on the field.

SUMMARY OF THE INVENTION

To solve the above mentioned problems, the present invention presents a combine harvester which comprises a threshing chamber having a threshing drum rotatable about a transverse axis with respect to the harvester body, a reaping section disposed forwardly of and in parallel with the threshing chamber, a separating section disposed rearwardly of the threshing chamber and connected thereto, a conveyor arranged between the reaping section and the threshing chamber. The width of the conveyor is constructed smaller than those of the reaping section and the threshing chamber, and a center line of the conveyor in the longitudinal direction of the harvester body being substantially accorded with a center line of the threshing chamber in the longitudinal direction of the harvester body. Guide means of almost V-shaped is disposed at an upper portion of the threshing chamber, the tip of the guide means is located to one side of the center of the threshing chamber and the legs of the V-shape extend from each side of the center line of the conveyor, wherein the center line of the reaping section in the longitudinal direction of the harvester body and the tip of the guide means are deviated to the same side with respect to the center line of the conveyor in the longitudinal direction of the harvester body.

Accordingly, compactness of the harvester body may be realized by disposing the operation section, the engine and so forth within the deviated width which is obtained by deviation of the reaping section with respect to the conveyor.

The present invention overcomes the disadvantages of the prior art in that the conveying amounts of the stalks in the transverse direction of the conveyor are different since the reaping section is deviated or offsetted to the right or left side with respect to the center line of the conveyor in the longitudinal direction of the harvester body, that the guide means may divide the stalks into the right and left groups of stalks having the different amounts to each other, and that the threshing drum is overloaded on either of the right or left portion thereof and the other portion of the threshing drum becomes to receive insufficient load so that the efficiency of threshing function may be decreased as a whole.

Since the stalks are evenly fed to the axial direction of the threshing drum by means of the dividing function of the guide in spite of the above mentioned arrangement of deviation, it makes good use of the advantages of this type of the combine harvester which aims at increasing efficiency of threshing function obtained by making long threshing courses around the threshing drum for the stalks to be threshed.

In other words, it is constructed to correct the different amount of the stalks at the right and left portions of the threshing drum that is caused by deviation of the reaping section to right or left, by means of deviation of the guide for dividing the stalks. Thus, it may be effective to carry out the threshing of stalks without overloaded or insufficient load partly acting on the threshing drum by simple and brief improvement of only deviating the position of the guide and then effectively increase the efficiency of threshing function in cooperation with division of stalks by the guide. As a whole, such a useful combine harvester may be provided without increasing manufacturing costs by extremely simple improvement in construction and without affecting or limiting a compact arrangement of elements assembing the harvester body.

Further, since the threshing function may be effectively carried out by provision of the above mentioned essential elements, the separating section which is disposed rearwardly of the threshing chamber may install therein a straw walker having no threshing function as one of the main elements of the separating section in order to change to the transmission of the straws.

Conclusively, the combine harvester of the invention has the following characteristic features. Namely, at first, the threshing chamber is located forward of the separating section and both are located rearwardly of the reaping section but not symmetrically about a longitudinal center thereof. Owing to such an asymmetrical layout, there is provided a space positioned rearwardly of said reaping section and in parallel to said threshing and separating sections in which the space accommodates the driving section, engine, etc.

Secondly, the guide means disposed within the threshing chamber is of an asymmetrical V-shape such that some problems which could arise by the above-noted asymmetrical layout of said threshing and separating sections are avoided. Particularly, the guide means has such a peculiar shape adapted to make the crop quantity fed to the left half portion of separating section equal to that fed to the right half portion of said separating section. The guide means of said peculiar shape is also effective to equalize the crop quantities between the right and left portions in the latter half of the crop passage within the threshing chamber.

The combine harvester of the invention is therefore advantageous in that the driving section, engine, etc. are not protruding from a side so that the unreaped crop is protected from being damaged by the harvester; and at the same time, a compact and asymmetrical layout provides a good balance and treatment of the crop is maintained well balanced between the right and left halves of said threshing chamber and separating section.

BRIEF DESCRIPTION OF THE DRAWINGS

The drawings show an embodiment of a combine harvester concerning the present invention in which.

DETAILED DESCRIPTION OF THE PREFERRED EMBODIMENT

Figure 1:
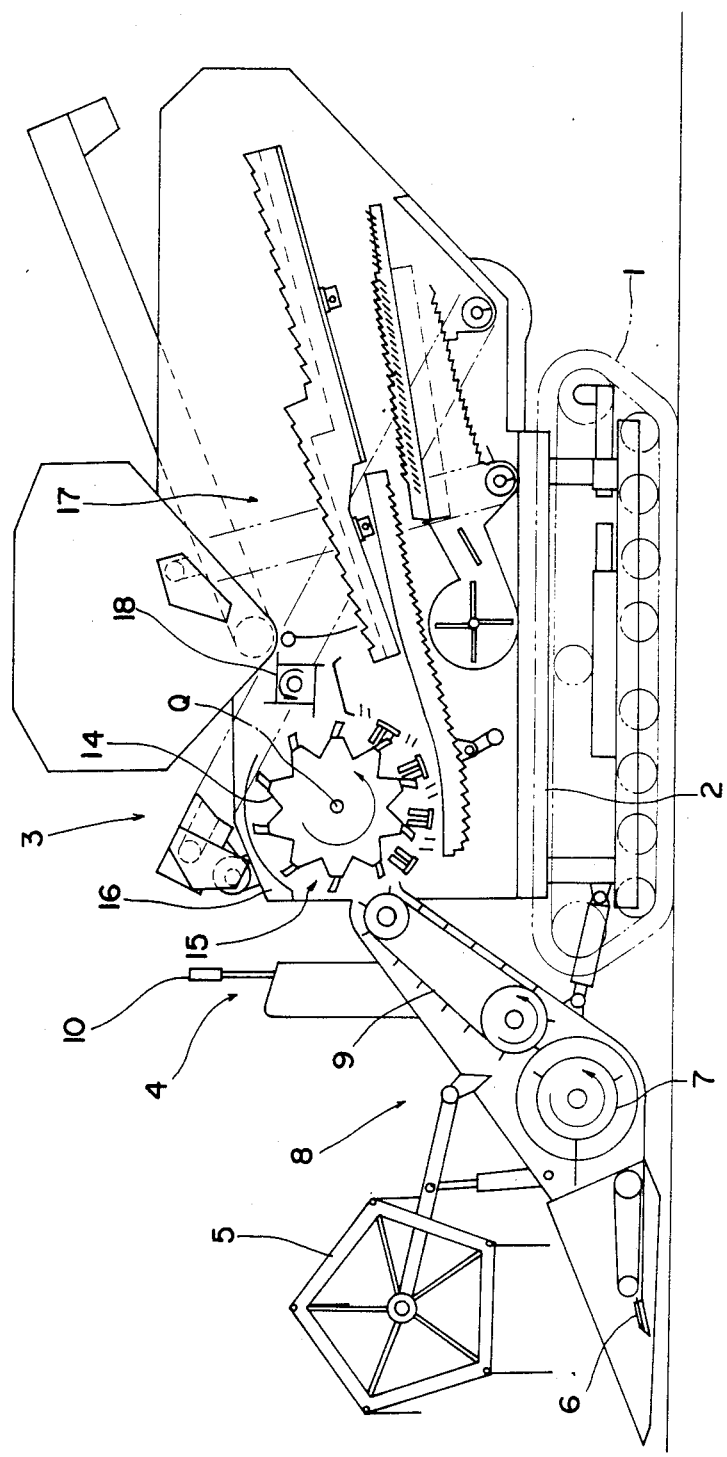
FIG. 1 is a sectional elevation view of the whole combine harvester.
Figure 2:
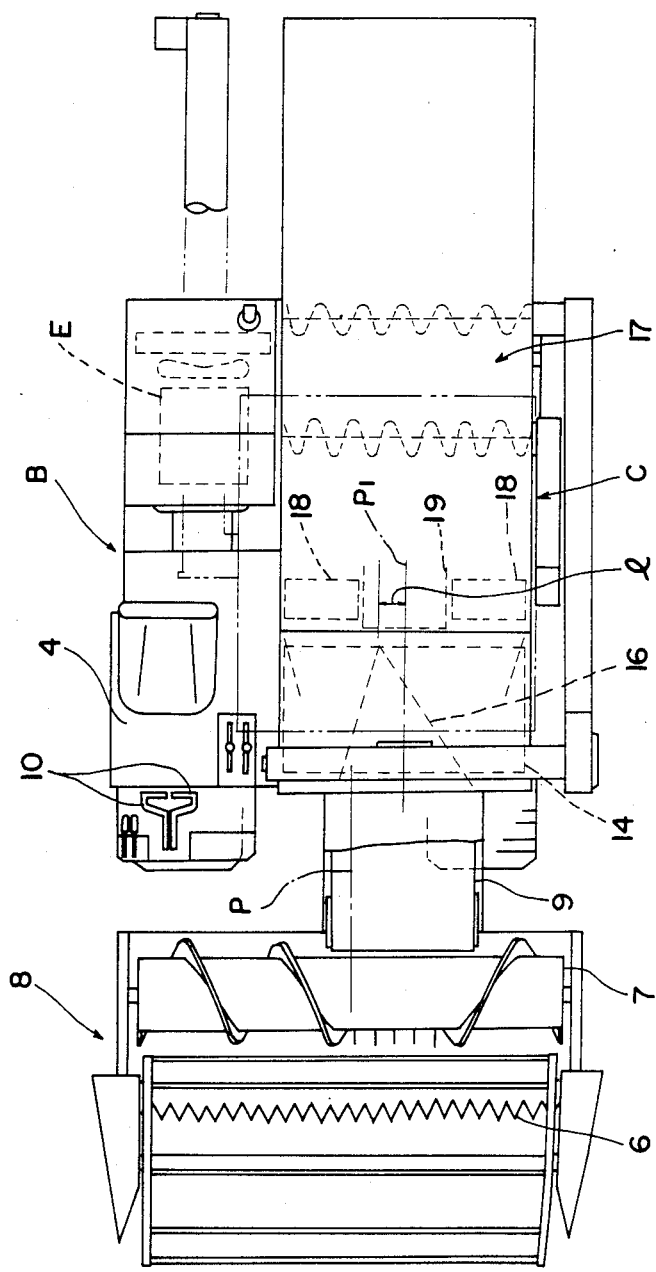
FIG. 2 is a plan view thereof.

As shown in FIG. 1 and FIG. 2, a combine harvester is so constructed that an automatic threshing apparatus 3 and a driving section 4 are mounted on a body frame 2 having a pair of running apparatus 1 of crawler type and a reaping section 8. The conveyor 3 for conveying the cut or mowed stalks to the threshing apparatus 3 is mounted on the front end of the harvester body and rotates up and down. The reaping section comprises a reel 5 for raking the stalks standing on the field, a cutting device 6 for cutting or mowing the raked-in stalks, an auger 7 for gathering and conveying the stalks to the middle portion thereof in the transverse direction of the harvester body.

Figure 3:
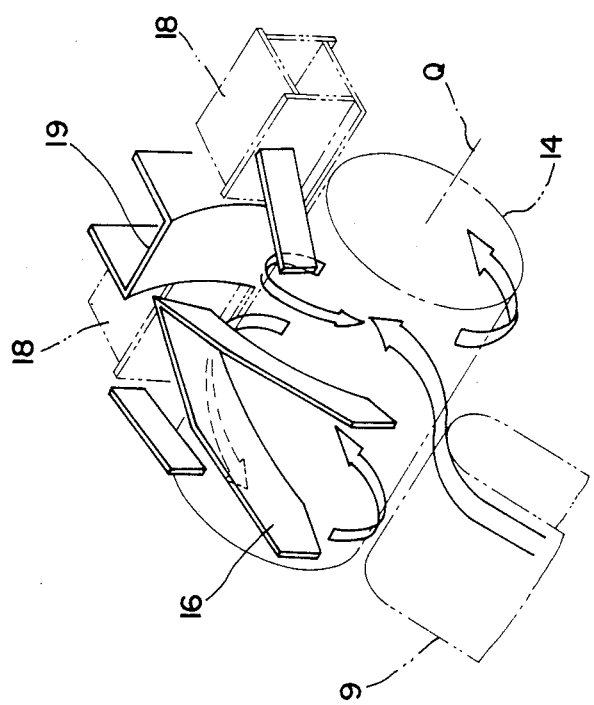
FIG. 3 is a perspective view briefly showing the state of conveying crops to be threshed in a threshing chamber.

The arrangement of the reaping section 8 and the threshing apparatus 3 will be described in detail as follows: As shown in FIGS. 1 to 3, in the threshing apparatus 3, a threshing chamber 15 houses a threshing drum 14 which is rotatable to thresh the stalks about a transverse axis Q. The threshing chamber is arranged to deviate or offset a center line P1 thereof in the longitudinal direction to either of the right or left side with respect to a center line P of the harvester body in the longitudinal direction thereof, and the conveyor 9, which is so constructed as to have a width narrower than that of the threshing chamber 15, is so arranged that the center line of the conveyor is accorded the center line P1 of the threshing chamber 15, so that the conveyed stalks may be supplied or fed to the middle portion of the threshing chamber 15 in the transverse direction of the harvester body.

The reaping section 8 having a width corresponding almost to the width of the harvester body, is so arranged that the center line of the reaping section 5 is accorded the center line P in the longitudinal direction of the harvester body.

In other words, the reaping section 8 is deviated or offsetted to either of the right or left side with respect to the conveyor 9 and the threshing chamber 15, so that the space obtained by deviation of the threshing chamber 15 may be utilized to compactly arrange an operation block B comprising a driving section 4 and an engine E, close to one of the transverse sides of a combine main portion C which comprises the threshing chamber 15, a separating section 17 and so forth.

Therefore, the side plane of the main portion C and one of the side planes have nearly the same distance from the center line P. Also, the side plane of the operation block B and the other side plane of the reaping section 8 have nearly the same distance from the center line P.

In other words, it means that the main portion C or the operation block B does not project greatly from the width of the reaping section 8.

To construct the threshing chamber 15, a guide 16 of V-shape is disposed in the middle portion of the threshing chamber 15 in such a manner that the V-shaped tip of the guide 16 is located on one side of the center of a separating section 17 and the end of the legs of the guide 16 may be located on opposite sides of the center line P1 along the upper portion of the revolution locus of the threshing drum 14 as seen in the side view thereof as shown in FIG. 2, the leg of the V-shaped guide 16 closer to the driving section is shorter than the other leg and is at a smaller angle relative to a center line through the tip parallel with the center line of the thresher. A beater 18 for rearwardly raking the threshed crops from the threshing chamber 15 onto a straw walker S in the separating section 17, is disposed at both the transverse side of a rear guide wall 19 formed with the middle portion of the threshing chamber 15 in the transverse direction thereof and disposed close to each of the transverse side ends of the threshing drum 14.

Accordingly, the stalks (the crops to be threshed) to be fed to the middle portion of the threshing chamber 15 in transverse direction thereof, are threshed and conveyed around the threshing drum 14 in cooperation with rotation of the threshing drum 14 and the rear guide wall 19 and then the stalks are divided into stalk portions in the rotation axis of the threshing drum 14 by means of the guide 16 so as to feed the stalks from both the transverse ends to the separating section 17.

Namely, the threshing chamber 15 is so constructed as to make the threshing courses around the threshing drum 14 long by effectively utilizing the length of the threshing drum in the direction of the rotation axis thereof so that efficiency of the threshing function may be increased. As the results of the good threshing efficiency, it becomes possible to use the straw walker S, which has no threshing function, as a main device of the separating section 17.

The V-shaped tip of the guide 16 is disposed to be deviated or offset for a distance l toward the side of deviation of the reaping section 8, i.e. toward the center line P of the harvester body with respect to the center line P1 of the conveyor 9 in the longitudinal direction of the harvester body. Then, the deviated disposition of the guide tip may correct the difference of the amounts of the gathered stalks at the right and left portions of the conveyor 9 due to the deviated disposition of the auger 7 with respect to the center line P1 of the conveyor 9 so that it is possible to feed almost the same amount of the stalks toward both the transverse side ends of the threshing chamber 15 so as to make the load evenly along the length of the threshing drum 14 in the rotation axis thereof and to increase efficiency of the threshing chamber 14 as a whole.

Further, it is possible to vary the ratio of the width of the conveyor in the direction of right and left with respect to the threshing chamber 15, as desired and also it is possible to vary the actual amounts of deviation of the reaping section in right or left direction with respect to the conveyor 9.

More further, the actual amounts l of deviation of the tip of the guide 16 may be varied on the basis of the ratio of deviation of the reaping section 8 in right or left direction with respect to the conveyor 9.

We claim:

1. A combine harvester comprising a reaping section, a conveyor section, a threshing section, a separation section and a driving section, said threshing section including a threshing chamber with a transverse threshing drum therein, said separation section disposed rearwardly of said threshing section with a longitudinal center line that aligns with a longitudinal center line of said threshing section and includes a straw walker extended longitudinally of said threshing section, said driving section being in parallel with said threshing section and said separation section juxtaposed therewith and including steering control means, a seat and an engine disposed rearwardly of said seat, said reaping section disposed forwardly of said driving section and said threshing section and having a transverse width which is substantially as great as the combined transverse width of said reaping section and said driving section, said reaping section having a longitudinal center line offset toward said driving section relative to said longitudinal center line of said threshing section, an auger disposed parallel with said reaping section between said reaping section and said conveyor section, said auger adapted to gather reaped stalks and to convey said reaped stalks inwardly from the opposite outer ends of said auger to an inner portion thereof in alignment with a longitudinal center line of said conveyor section, said conveyor section disposed between said auger and said threshing section with the longitudinal center line thereof in alignment with said longitudinal center line of said threshing section and having a transverse width which is less than the transverse width of said threshing chamber, guide means having a substantially V-shape disposed in an upper portion of said threshing chamber, said guide means comprising a V-tip end located above a rear portion of said threshing chamber with the V-tip end offset toward said driving section from said longitudinal center line of said threshing chamber and two diverging legs extending from the V-tip end toward a front portion of said threshing chamber, said V-tip end being offset from the longitudinal center line of said threshing chamber toward said driving section and located on a longitudinal line between the longitudinal center lines of said threshing chamber and said reaping section, one of said legs of the V-shaped guide means being adjacent to the driving section, shorter in length and having a smaller angle with respect to a center line through the tip of the V-shaped guide means than the other leg such that free ends of said two legs of the V-shaped guide means can be positioned substantially in a symmetrical relationship with respect to the longitudinal center line of said threshing chamber.

2. The combine harvester of claim 1 further comprising a rear guide wall disposed at a transverse middle portion of the rear portion of said threshing chamber and beaters located respectively on opposite sides of said rear guide wall, wherein said rear guide wall cooperates with said threshing chamber so as to transfer the reaped stalks around the threshing drum, and said beaters are adapted to rake the reaped stalks into the separation section.

* * * * *